H. SKINNER
WINDOW FOR LOCOMOTIVES, &c.

No. 18,304.  Patented Sept. 29, 1857.

UNITED STATES PATENT OFFICE.

HENRY SKINNER, OF FULTON, NEW YORK.

IMPROVEMENT IN WINDOWS FOR LOCOMOTIVES, &c.

Specification forming part of Letters Patent No. 18,304, dated September 29, 1857.

*To all whom it may concern:*

Be it known that I, HENRY SKINNER, of Fulton, in the county of Oswego and State of New York, have invented a new and Improved Window for Locomotive-Engines and other Structures to prevent frost and vapor from accumulating on the glass; and I do hereby declare that the following is a full, clear, and exact description thereof, reference being had to the accompanying drawings, making a part thereof, in which—

Figure 2:
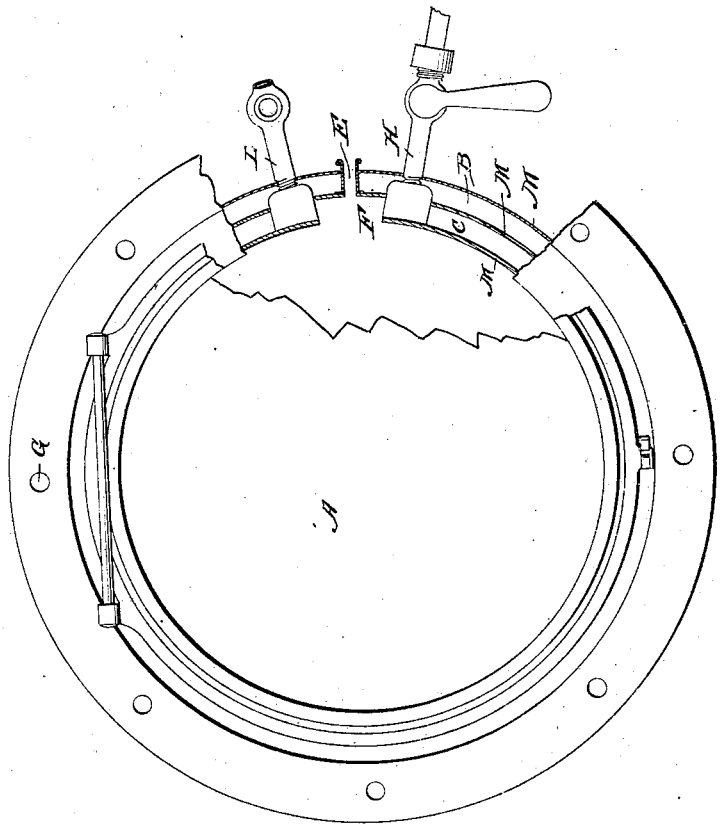
Figure 1:
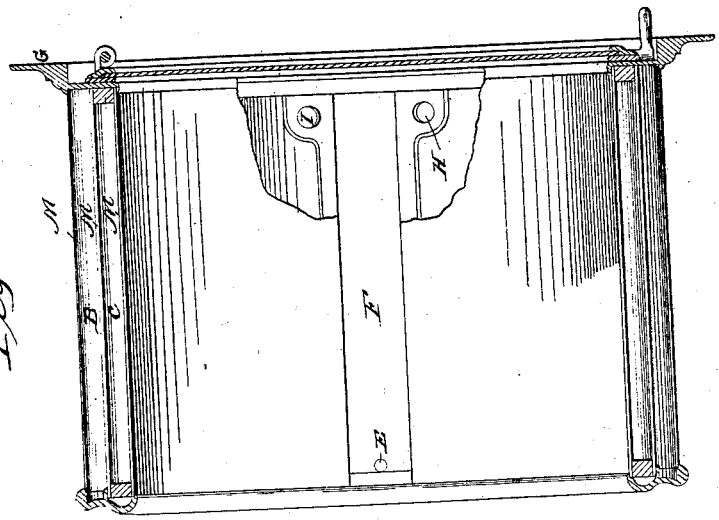

Figure 1 represents a longitudinal cross-section. Fig. 2 represents a plan view with the base and glass of the window broken, so as to expose the chambers of the window.

Similar letters, where they occur in the separate figures, denote like parts.

The nature of my invention consists in providing the front part of a locomotive-engine house or the head-light to a locomotive-engine with a window, the glass of which, by being heated with steam or hot air, will remain transparent where exposed to vapor or frost.

To enable others skilled in the art to make and use my invention, I will proceed to describe its construction and operation with reference to the drawings.

I construct a tube in a cylindrical or any other desired form, usually a cylindrical tube of sheet-iron or copper, of about twelve inches in diameter and ten inches in length. I inclose this within another of about thirteen inches in diameter, and the two I inclose in another of about fourteen inches in diameter, all of the same length, as shown at M M M in the accompanying drawings. To one end of these cylinders I adapt a strong firm piece of plate-glass, as shown at A. The chamber or cavity C, between the inside cylinder and the cylinder next thereto, I fill with steam or hot air, so as to heat the glass or glasses A, adapted to the ends of the cylinders. The chamber or cavity B, between the outside and middle cylinder, I fill with charcoal or some other non-conducting substance, so as to prevent the rapid condensation of the steam. I surround the perimeter of the glass with woolen cloth or some other non-conductor, that the glass or glasses may heat gradually. I adapt to the cylinder one or more glasses, as convenience may require. I communicate to the chamber C steam from the boiler upon the locomotive, or heat from any other source, through the faucet H. I hang the glass upon a hinge in any ordinary form, or adapt it permanently to the tube, as convenience may require. I construct in the bottom of the inside cylinder a sink (shown at F) to conduct whatever may collect in the tube off, with an aperture, as shown at E, to discharge the same. This window may be adapted temporarily to the house of a moving locomotive-engine, or to the head-light to such engine, or may be framed permanently to the same. Ordinarily I adapt this cylinder in a horizontal position to the frame-work of the locomotive, with the glass next to the observer. The steam or heat being communicated is radiated from the inside surface of the inner cylinder, filling the cavity constantly with heated air, and at the same time keeping the glass constantly hot, and thereby preventing any vapor or frost from accumulating thereon. The elasticity of the heated air is so great as to tend to keep out of the cylinder falling sleet or snow while the locomotive is in motion, which also aids in preserving the transparency of the glass.

What I claim as my invention, and desire to secure by Letters Patent, is—

The application of heat to glass to prevent vapor or frost from collecting thereon, substantially as described, and for the purposes set forth.

HENRY SKINNER.

Witnesses:
   AMOS G. HULL,
   E. S. PARDEE.